United States Patent Office 3,535,261
Patented Oct. 20, 1970

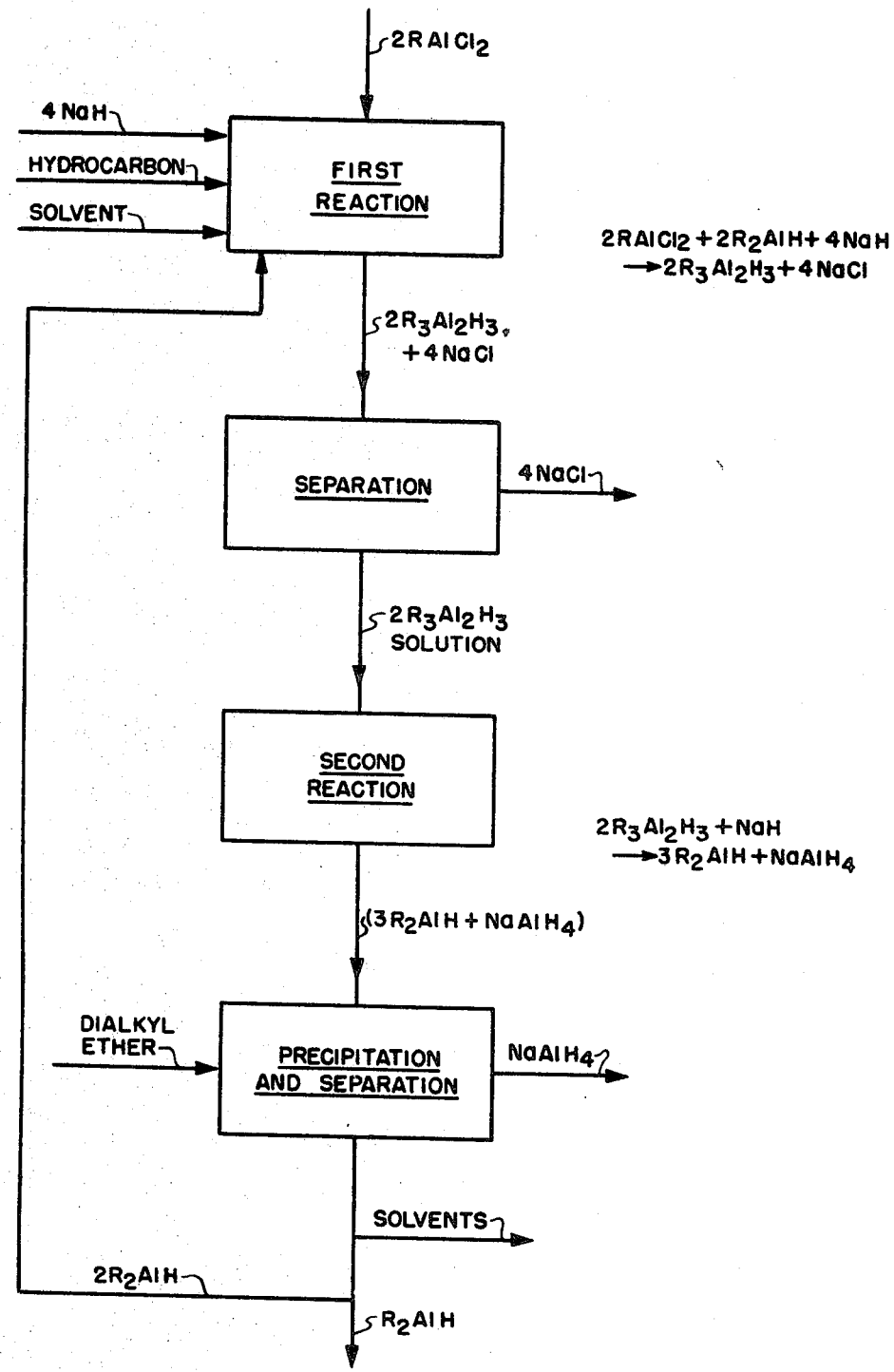

3,535,261
ALKYL ALUMINUM SESQUIHYDRIDES
Paul Kobetz and Roy J. Laran, Baton Rouge, La., assignors to Ethyl Corporation, New York, N.Y., a corporation of Virginia
Original application Dec. 17, 1963, Ser. No. 331,202, now Patent No. 3,453,093, dated July 1, 1969. Divided and this application Jan. 27, 1969, Ser. No. 816,470
Int. Cl. C07f 5/06
U.S. Cl. 252—182        3 Claims This is a division of application Ser. No. 331,202, Dec. 17, 1963, now Pat. No. 3,453,093, July 1, 1969.

This invention relates to the manufacture of complex bimetallic hydrides, and in particular, sodium aluminum hydride, $NaAlH_4$. More particularly, the invention relates to a new and improved process whereby this complex metal hydride is readily made at low pressures and a concurrent product is a dialkyl aluminumm hydride.

Sodium aluminum hydride is a known commodity and has heretofore been made by the reaction of aluminum trichloride and sodium hydride. It is useful for the reduction of organic compounds and for generation of hydrogen gas by controlled reaction with water.

Dialkyl aluminum hydride, a concurrent product of the present process, is a known compound. Diethyl aluminum hydride has been made by the reaction of triethyl aluminum, aluminum, and hydrogen, as in U.S. Pat. 2,787,626. In the case of dimethyl aluminum hydride, this product has not been commercially available, although its preparation by the reaction of sodium hydride and dimethyl aluminum chloride has been known. The dialkyl aluminum hydrides are useful as catalysts or catalyst components for the polymerization of lower olefins.

The object of the present invention is to provide a new and convenient process for the manufacture of sodium aluminum hydride, $NaAlH_4$. Another object is to provide a process for the concurrent production of a dialkyl aluminum hydride, the alkyl groups of this product having from one to two carbon atoms, viz, including the methyl and ethyl groups. An additional object is to provide certain inert compositions, namely, solutions of alkyl aluminum sesquihydrides.

Details of the invention and of the best mode of its conduct will be clear from the detailed description and examples given hereinafter and from the accompanying figure which is a schematic representation of the process sequence operations in a particularly preferred embodiment of the invention.

It has been discovered that sodium aluminum hydride and a dialkyl aluminum hydride are readily developed by the reaction of sodium hydride and an alkyl aluminum dichloride. The stated reactants can be reacted in two discrete stages, but in every instance the overall reaction is:

(1)   $2AlCl_2 + 5NaH \rightarrow R_2AlH + NaAlH_4 + 4NaCl$

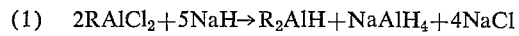

wherein R represents an alkyl group, consisting of carbon and hydrogen, and having from one to two carbon atoms.

The alkyl aluminum dichloride which is an essential reactant for the process may be provided as is, viz, unaccompanied by any other component, or may be in the presence of a dialkyl aluminum chloride, the mixture being represented by the common terminology of an alkyl aluminum sesquichloride, in which instance the overall reaction is (2)   $2R_3Al_2Cl_3 + 7NaH \rightarrow 3R_2AlH + NaAlH_4 + 6NaCl$

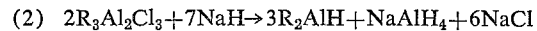

It is seen from Equations 1 and 2, that, when an alkyl aluminum sesquichloride is used as the initial feed material, the relative proportion of dialkyl aluminum hydride produced concurrently with the sodium aluminum hydride is tripled. Alternatively, then, when the sodium aluminum hydride production is to be maximized, it is preferable to employ as the initial aluminum containing feed material the alkyl aluminum dichloride, viz, methyl aluminum dichloride or ethyl aluminum dichloride.

It will be further noted that sodium chloride is concurrently produced, and as is shown hereinafter, this necessitates a separation step to obtain relatively pure sodium aluminum hydride.

In a preferred category of embodiments, a two-stage process is employed wherein the alkyl aluminum chloride component is reacted with only part of the sodium hydride initially in a hydrocarbon reaction medium, and all the chloride content is converted to sodium chloride which is precipitated and separated. The resultant solution, then containing only alkyl groups and hydrogen bonded to the aluminum content, is reacted further with additional sodium hydride, which results in the formation of sodium aluminum hydride and dialkyl aluminum hydride.

Equations representing, generally, a two-stage operation as outlined above, are, for the case of using an alkyl aluminum sesquichloride as a feed material, as follows:

(3)   $2R_3Al_2Cl_3 + 6NaH \rightarrow 2R_3Al_2H_3 + 6NaCl$ (4)   $2R_3Al_2H_3 + NaH \rightarrow 3R_2AlH + NaAlH_4$

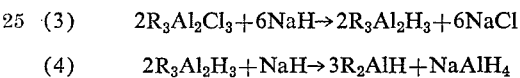

In an operation as illustrated by Equations 3 and 4 above, the first reaction is conducted in an inert liquid hydrocarbon reaction medium wherein the sodium chloride formed by the reaction of the sodium hydride and the chlorine content is precipitated. The material in solution is then termed an alkyl aluminum sesquihydride, $R_3Al_2H_3$, and is considered as an equimolal mixture of dialkyl aluminum hydride and alkyl aluminum dihydride, the latter component being stabilized by the dialkyl compound. The liquid phase remaining after the sodium chloride is separated in the first stage is then reacted with additional sodium hydride according to Equation 4, which forms sodium aluminum tetrahydride and a dialkyl aluminum hydride. This second reaction is normally carried out in the same solvent remaining from the first stage. The sodium aluminum hydride does not precipitate, however, apparently because of complexation in soluble form of the dialkyl aluminum hydride and the sodium aluminum hydride. To release solid sodium aluminum hydride, a lower alkyl dialkyl ether can be added. Thus, diethyl ether results in precipitation of the sodium aluminum hydride and allows its separation by filtration and drying, leaving the dialkyl aluminum hydride as a loose complex with the ether dissolved in the solvent.

In the embodiments of the process wherein the feed material is an alkyl aluminum dichloride, a highly effective process involves the recycle of a portion of the dialkyl aluminum hydride formed as a joint product, as is illustrated schematically by reference to the figure.

Referring to the figure, in a first stage reaction, an alkyl aluminum dichloride and sodium hydride are reacted in the presence of a recirculated quantity of dialkyl aluminum hydride in approximately equimolar proportions to the alkyl aluminum dichloride, the sodium hydride being provided in proportions of about two moles per mole of alkyl aluminum dichloride. The reaction is carried out in an inert hydrocarbon solvent such as benzene, toluene, or in other aromatic or aliphatic liquid hydrocarbons. As a result of the reaction therein, as indicated by Equation 5 below, a solution of an alkyl aluminum sesquihydride is produced. The function of the recirculated dialkyl aluminum hydride is, apparently, to stabilize the alkyl aluminum dihydride which is the result of the reaction of the alkyl aluminum dichloride and the sodium hydride, as indicated by Equation 6.

(5) $2RAlCl_2 + 2R_2AlH + 4NaH \rightarrow 2R_3Al_2H_3 + 4NaCl$ (6) $2RAlCl_2 + 4NaH \rightarrow 2RAlH_2 + 4NaCl$ The next step is the separation of sodium chloride produced as an insoluble precipitate, by filtration, centrifuging or some other liquid-solid separation technique. The liquid phase remaining is then subjected to reaction with an additonal mole of sodium hydride. A liquid phase is produced, and in order to isolate solid crystalline sodium aluminum hydride, diethyl ether or a similar lower dialkyl ether in which sodium aluminum hydride is insoluble is added thereto and results in precipitation of the sodium aluminum hydride. The thus formed precipitate is separated and subsequently purified further, if desired, and the resultant liquid phase is stripped of the first solvent, at least in part, by a vacuum distillation or similar partial pressure separation process. The dialkyl aluminum hydride forms a complex with a lower-dialkyl ether, but this is readily resolvable by heating whereby the diethyl ether or simiar dialkyl ether is recovered for re-use, and the dialkyl aluminum hydride product is obtained in good yield. The dialkyl aluminum hydride is withdrawn as a product only to the extent of about one-third of the effluent stream at this point.

Working examples of the process and the several variations thereof are given below:

EXAMPLE 1

A supply of methyl aluminum sesquichloride in benzene solution was added to a slurry of sodium hydride in benzene. The methyl aluminum sesquichloride solution was added in a dropwise manner while stirring the mixture vigorously, the addition being over a period of three hours. The sodium hydride slurry contained about 24 weight percent sodium hydride based on the benzene, and was used in proportions of almost exactly three moles per mole of methyl aluminum sesquichloride. The methyl aluminum sesquichloride was in solution in benzene in concentration of about 73 weight percent. The reaction was conducted at room temperature and sodium chloride was steadily precipitated during the entire reaction period of three hours.

The slurry from the above reaction was filtered, and the cake washed with benzene, the washings being added to the filtrate.

In the second step of the operation, the clear filtrate solution had sodium hydride added thereto, in the proportions of about one mole per 4.6 atoms of the aluminum content of the solution. In other words, the proportion of sodium hydride reaction in the second stage was in the proportion of about one mole per 2.3 moles of methyl aluminum sesquihydride in the solution. The reaction was conducted at around 60° C. and no precipitation occurred. Cooling of the reacted mixture to 10° C. resulted in some small precipitation, but addition of diethyl ether, in the proportions of about 40 volume percent of the solution, resulted in prompt salting out of white solids. These were filtered, washed with ether, and dried, and a yield of about 28 parts of dried material was obtained. Analysis by hydrolysis and measurement of hydrogen evolved showed that the sodium aluminum hydride product had a purity of approximately 91 percent, and the overall yield, based upon the methyl aluminum sesquichloride initially fed, was over 80 percent of pure sodium aluminum hydride content.

The filtrate remaining after removal of the sodium aluminum hydride solids is a solution of a complex of diethyl ether with dimethyl aluminum hydride. If desired to recover the dimethyl aluminum hydride as such, the benzene and ether are removed by distillation under a partial vacuum. A high yield of dimethyl aluminum hydride, a colorless volatile liquid, is obtained.

EXAMPLE 2

As previously indicated, the process and the several variations thereof are generally applicable to processing both methyl and ethyl compounds. Thus, when the operations of the preceding example are repeated, but instead of a feed consisting of methyl aluminum sesquichloride, ethyl aluminum sesquichloride, $(C_2H_5)_3Al_2Cl_3$, is substituted for the methyl aluminum sesquichloride, comparable efficiency is obtained, and the joint product with the sodium aluminum hydride is a high purity diethyl aluminum hydride.

EXAMPLE 3

As previously indicated, the starting material, instead of being an alkyl aluminum sesquichloride mixture, can be an alkyl aluminum dichloride. Such compounds are readily made by the interreaction of a sesquichloride compound and aluminum chloride in the appropriate proportions according to the general equation (7) $R_3Al_2Cl_3 + AlCl_3 \rightarrow 3RAlCl_2$ In a typical operation using such a material, one mole of methyl aluminum dichloride is mixed with a mole of recirculated dimethyl aluminum hydride, in a benzene solution, and reacted by techniques similar to that already described with a suspension of sodium hydride in an inert alkane hydrocarbon such as 2,2,3-trimethyl pentane. The sodium hydride is added in approximately the proportions corresponding to the atoms of chlorine provided in the methyl aluminum dichloride fed. The reaction proceeds smoothly, resulting in a solution of methyl aluminum sesquihydride, $(CH_3)_3Al_2H_3$, in the hydrocarbon, and precipitated sodium chloride. The sodium chloride is removed by a careful filtration, and the hydrocarbon solution is then reacted with additional sodium hydride, in the proportions of about one mole per four atoms of the aluminum content of the solution, and thereafter a low alkyldialkyl ether, such as dimethyl ether, diethyl ether, methyl ethyl ether, diisopropyl ether, or the like, is added to the liquid phase, and a sodium aluminum hydride product is crystallized out. This is readily separated by filtration, and provides, after drying, a high purity good quality product. About two-thirds of the dimethyl aluminum hydride remaining in solution is recirculated to the first reaction stage.

The function of the recirculated dialkyl aluminum hydride is not precisely understood, but is believed to provide a stabilizing action by immediate complexing with the theoretical compounds methyl aluminum dihydride which results upon the reaction of methyl aluminum dichloride with the appropriate quantity of sodium hydride. This stabilizing action is highly desirable when a high purity sodium aluminum hydride is desired, viz., unaccompanied by sodium chloride solids, or when a solution of an alkyl aluminum sesquihydride is desired as a side product.

EXAMPLE 4

When ethyl aluminum dichloride is substituted as the feed material in the first reaction stage of Example 3, comparable reaction is obtained, and the products are sodium aluminum hydride and diethyl hydride.

In those cases wherein the presence of sodium chloride in the sodium aluminum hydride product is not objectionable, its removal after the first reaction stage is not necessary, and the several reactions can be merged into one. Under such circumstances, the alkyl aluminum dichloride is reacted in a single stage with sodium hydride in the proportions of about five moles or thereabouts of sodium hydride to two moles of the alkyl aluminum dichloride. The products are a precipitate of a mixture of sodium chloride and sodium aluminum hydride in the proportions of about 20 mole percent sodium aluminum hydride concentration. This co-precipitate can be resolved and a good quality sodium aluminum hydride removed, by extraction of the filtered and dried solids with a solvent for the sodium aluminum tetrahydride, viz., tetrahydrofuran or the lower dialkyl ethers of lower polyalkylene glycols.

From the foregoing description and examples, it will be seen that the precise techniques of operation can be appreciably varied. Generally, the specific identiy of the solvent employed for the reaction medium is not highly critical, but of course the solvent should be non-reactive with the reactants and should not be a solvent for sodium chloride. Aromatic hydrocarbons as specifically illustrated, and normally liquid alkane hydrocarbons or mixtures of hydrocarbons are highly effective. Thus, when hexane, pentane, naphthas, or similar hydrocarbon compounds or mixtures are substituted in the foregoing examples for the solvents illustrated for the first reaction, comparable results will be obtained. The sodium hydride, being a solid, is desirably pre-slurried in the reaction medium.

As, in all cases, a joint product is the corresponding dialkyl aluminum hydride, for full resolution of the two products, precipitation of the sodium aluminum hydride is essential and this is accomplished, as indicated, by the addition of an appropriate quantity of a lower dialkyl ether.

Temperatures of operation are not critical and can vary from, normally, about 0° C. to about 150° C., but the preferred temperatures are from about 20 to 60° C. Similarly, the pressure of operation is normally ambient pressure, or the vapor pressure of the reacting mixture at the temperature of operation.

The precise proportions of sodium hydride used are not highly critical. Thus, variations of plus or minus ten percent of the theoretical requirements for the several reactions are permissive. For best results, variations of not more than two percent are desirable.

The methyl aluminum sesquihydrides, or ethyl aluminum sesquihydride, solution produced as an intermediate by the reaction of sodium hydride with the corresponding alkyl aluminum is useful in its own right. It is susceptible to conversion, by olefin addition, to mixed alkyl trialkyl aluminum compounds, or as a component of polymerization catalyst systems.

Having described the process, what is claimed is:

1. A composition consisting essentially of an inert liquid hydrocarbon solution of an alkyl aluminum sesquihydride, the alkyl groups having from one to two carbon atoms.
2. A composition consisting essentially of an inert liquid hydrocarbon solution of methyl aluminum sesquihydride.
3. A composition consisting essentially of an inert liquid hydrocarbon solution of ethyl aluminum sesquihydride.

References Cited
UNITED STATES PATENTS

| | | | |
|---|---|---|---|
| 2,915,541 | 12/1959 | Ziegler et al. | 260—448 |
| 2,915,542 | 12/1959 | Robinson et al. | 260—448 |

MAYER WEINBLATT, Primary Examiner

I. GLUCK, Assistant Examiner

U.S. Cl. X.R.

23—365; 252—188; 260—448